(12) United States Patent
Rousseau et al.

(10) Patent No.: US 9,022,442 B2
(45) Date of Patent: May 5, 2015

(54) TRANSFER DEVICE COMPRISING A GRIPPER

(75) Inventors: Nicolas Rousseau, Octeville sur Mer (FR); Jocelyn Michel, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 14/005,636

(22) PCT Filed: Mar. 16, 2012

(86) PCT No.: PCT/EP2012/054646
§ 371 (c)(1),
(2), (4) Date: Sep. 17, 2013

(87) PCT Pub. No.: WO2012/123566
PCT Pub. Date: Sep. 20, 2012

(65) Prior Publication Data
US 2014/0008927 A1    Jan. 9, 2014

(30) Foreign Application Priority Data

Mar. 17, 2011    (FR) ..................... 11 52176

(51) Int. Cl.
*B65G 47/84* (2006.01)
*B29C 49/42* (2006.01)
*B25J 15/00* (2006.01)
(Continued)

(52) U.S. Cl.
CPC ......... *B25J 15/0028* (2013.01); *B29C 49/4205* (2013.01); *B65G 47/847* (2013.01); *B65G 2201/0247* (2013.01); *B29K 2067/003* (2013.01); *B29C 49/06* (2013.01); *B29C 49/36* (2013.01)

(58) Field of Classification Search
USPC ............... 294/90, 198, 106, 86.4, 110.1, 116; 425/526, 534; 198/475.1, 475, 476.1, 198/470.1, 803.3, 803.4, 803.8, 803.11; 414/226.02
See application file for complete search history.

(56) References Cited

U.S. PATENT DOCUMENTS 5,581,975 A * 12/1996 Trebbi et al. ..................... 53/300
5,683,729 A * 11/1997 Valles ............................ 425/526
(Continued)

FOREIGN PATENT DOCUMENTS

CN    1744982 A    3/2006
CN    101164845 A    4/2008
(Continued)

OTHER PUBLICATIONS

International Search Report dated Apr. 26, 2012; corresponding to PCT/EP2012/054646.
(Continued)

*Primary Examiner* — Paul T Chin
(74) *Attorney, Agent, or Firm* — Young & Thompson

(57) ABSTRACT

A gripper (42) for gripping an object (14), intended for a transfer device includes two jaws (64, 66). Each of the jaws includes: a recess (92), and a first clamping portion (94) and a second locking portion (96). The first clamping portion (94) of each jaw (64, 66) of the gripper (42) includes a supporting surface and, when the gripper (42) is closed around an object (14) occupying a predetermined reference position, the supporting surface is intended to engage with a portion of a bearing surface of a radial collar of the object.

9 Claims, 5 Drawing Sheets

(51) Int. Cl.
*B65G 47/86* (2006.01)
*B29K 67/00* (2006.01)
*B29C 49/06* (2006.01)
*B29C 49/36* (2006.01)

(56) References Cited

U.S. PATENT DOCUMENTS

| | | | |
|---|---|---|---|
| 5,863,571 A * | 1/1999 | Santais et al. | 425/526 |
| 5,893,700 A * | 4/1999 | Kronseder | 294/116 |
| 7,581,635 B2 | 9/2009 | Lecomte | |
| 7,849,996 B2 | 12/2010 | Leblond et al. | |
| 7,998,396 B2 * | 8/2011 | Rousseau et al. | 264/523 |
| 8,206,144 B2 * | 6/2012 | Ng et al. | 425/526 |
| 8,307,977 B2 | 11/2012 | Nguyen et al. | |
| 2006/0097417 A1 | 5/2006 | Emmer | |
| 2010/0077703 A1* | 4/2010 | Gourlaouen | 53/473 |
| 2014/0175819 A1* | 6/2014 | Wilson et al. | 294/198 |

FOREIGN PATENT DOCUMENTS

| | | |
|---|---|---|
| CN | 101835701 A | 9/2010 |
| EP | 1 922 273 | 11/2008 |
| EP | 2 159 172 | 3/2010 |
| EP | 2 248 759 | 11/2010 |
| WO | 00/48819 | 8/2000 |
| WO | 2005/095238 | 2/2005 |
| WO | 2008/132090 | 11/2008 |
| WO | 2008/139088 | 11/2008 |
| WO | 2011/015371 | 2/2011 |

OTHER PUBLICATIONS

Chinese Office Action, dated Sep. 3, 2014, from corresponding CN application.

* cited by examiner

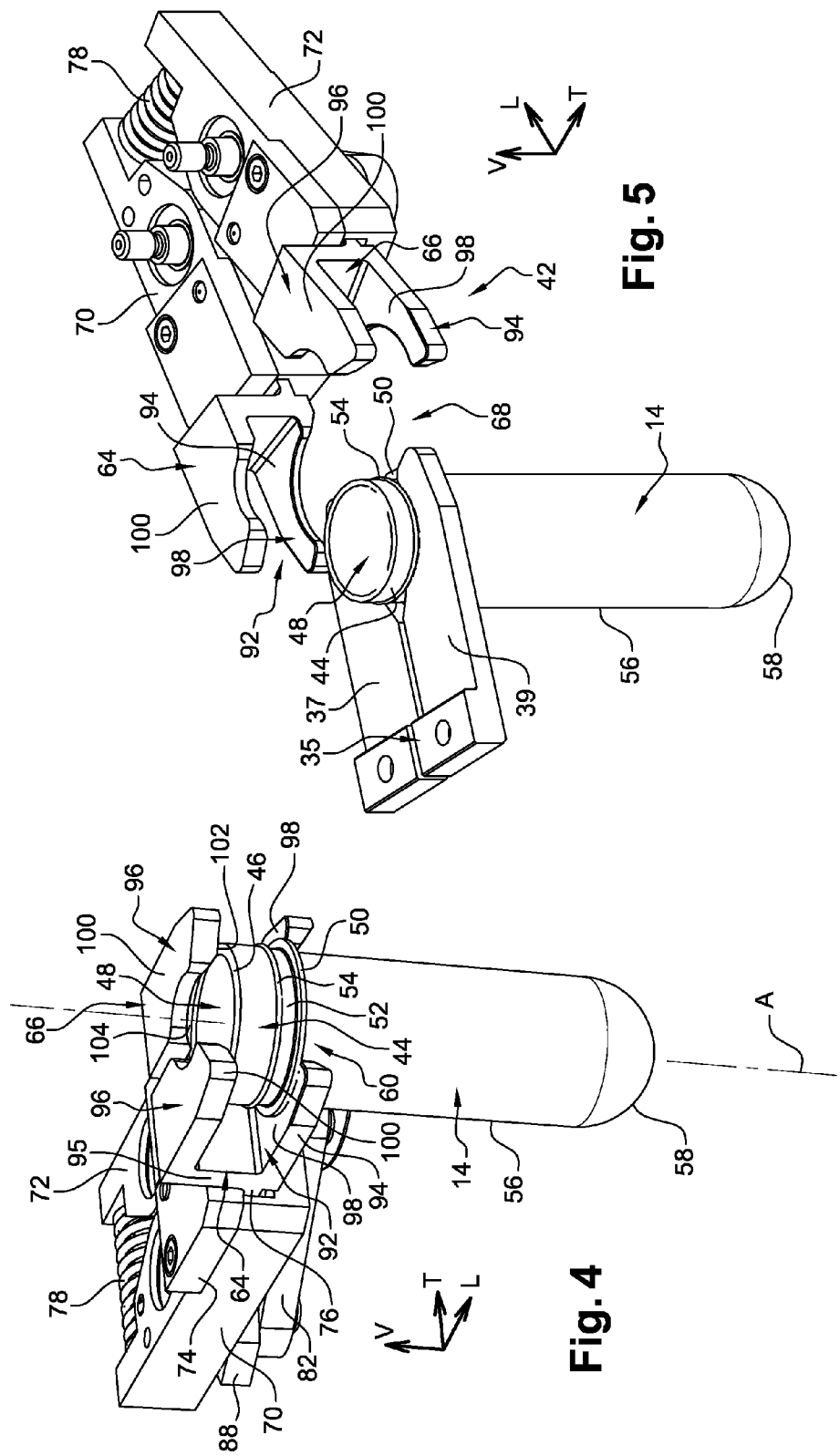

TRANSFER DEVICE COMPRISING A GRIPPER

BACKGROUND OF THE INVENTION

The present invention concerns a transfer device comprising an improved gripper.

The present invention more particularly concerns a device for transferring objects, such as preforms or containers, including on the one hand a neck having its final shape provided with a rim delimiting an opening and at least one annular collar projecting radially and on the other hand a hollow body extending axially away from the opening of the neck from a junction section adjacent the collar to a bottom, said transfer device including at least one gripper which includes at least a first jaw and a second jaw delimiting between them a housing adapted to receive a portion of said object, the gripper being adapted to occupy at least an open position in which an object can be extracted from between or inserted between the jaws to occupy a particular reference position in the housing and a closed position in which, when such an object is present, said jaws cooperate with at least a portion of the object occupying said particular reference position.

DESCRIPTION OF THE RELATED ART

There are known in the prior art transfer devices of this type that generally include a rotary support that is driven continuously in rotation about a vertical rotation axis.

The rotary support of such a transfer device carries at least one transfer arm that includes, at a free end, at least one support element or a gripper that is adapted to seize an object including a neck and provided with a radial collar, in particular a preform or a container.

Such transfer devices are used in installations for manufacturing containers, notably for manufacturing bottles, flasks, etc. in the form of hollow bodies.

These containers are manufactured from preforms or blanks obtained by injection molding plastic materials, notably polyethyleneterephthalate (PET), which are then heat treated in an oven before being transformed into containers in a mold.

Such a preform includes a neck that has its final shape, i.e. that of the neck of the finished container obtained after the transformation operation, and this is why only the body of the preform is heated during heat treatment in the oven.

In fact, the neck must be protected from the heat and is generally cooled at least by a flow of air in order to prevent any deformation, notably of such a kind as to compromise the subsequent operation of closing the container, for example by means of a screw cap.

The process of forming the hot preform in the mold in order to produce a container is carried out by means of a fluid under pressure in a machine of the manufacturing installation. The forming or shaping therein is generally carried out by blowing or by drawing-blowing the preform by means of a gas under pressure or at least in part by filling it with a liquid under pressure.

Machines of this kind for transforming preforms into containers are known, in particular blowing (or drawing-blowing) machines, of which there are two different designs, known as "linear" and "rotary" type machines.

For more details see the documents indicated hereinafter that describe by way of nonlimiting example machines conforming to both these designs.

The document WO-2008/132090 describes a transfer device for a linear machine and the document WO-2005/095238 describes a transfer device for a rotary machine including a carousel provided circumferentially with a plurality of molding stations.

Thus transfer or conveyor devices are used in an installation for manufacturing containers to carry out successively the various transport operations that mark out the steps of the manufacturing process.

In the oven, the preforms are conveyed by a transfer device generally including at least one member, such as a chain or a belt, driven in a closed loop along a particular heating path and means for supporting the preforms connected to said drive member to move therewith.

The document WO-00/48819 describes and represents one example of such means for supporting or holding preforms in an oven, which means are introduced into the neck of the preform via the opening.

Support means of this type, also known as "whirlers" because they preferably rotate the preform on itself, leave the exterior of the neck, and more particularly the collar, free to be seized by other loading/offloading means to carry out the stripping and transfer of the preforms.

The document EP-1.922.273 describes one example of such loading/offloading means adapted to strip the preforms on leaving the oven and transferring them for transport in the downstream direction.

In fact, the subsequent transport operation consists in transferring the "hot" heat-treated preforms successively, generally one by one, from the exit of the oven to the mold of the machine, in order to transform them therein into containers by one of the aforementioned forming processes.

In the prior art, to transfer the hot preform from the exit of the oven to the mold, it is notably known to use a transfer device including at least one gripper the jaws of which are adapted to seize the preform selectively, holding it by the outside of the neck.

The gripper is generally mounted on and fastened to the free end of a transfer arm, the transfer arm being carried by a support mounted to be mobile in rotation about a vertical rotation axis of the device to convey the preform from the exit of the oven to the mold of the machine in perfect synchronization with the transport device of the oven on the upstream side and the machine on the downstream side.

Thus there are known in the prior art transfer devices including a plurality of transfer arms provided with grippers and disposed circumferentially around the rotation axis.

The transfer arms are sometimes articulated, or at least telescopic, i.e. mounted to be mobile in translation in the radial direction between at least a deployed position in which the preform is seized or released and a retracted position in which the preform is transferred.

The transfer arms of the transfer devices are sometimes also adapted to execute a so-called pitch variation function during the transfer travel.

This function consists in varying the distance between two consecutive transfer arms during the transfer of the preforms so as to vary the pitch between two consecutive objects, notably from a first pitch corresponding to the initial distance between two successive preforms at the exit from the oven determined by the latter's transport device to a second pitch corresponding to the final distance between two successive preforms necessary for feeding the machine.

The second pitch is determined by the distance between two consecutive molds on a rotary machine, for example, or two molding cavities of the same mold on a linear machine.

Rotary machines predominate, however, notably because of the container manufacturing throughputs achieved, which are generally higher than those of linear machines. The prior art transfer devices described hereinafter are therefore more particularly intended to function with a rotary machine.

The arms of the transfer device, each provided with at least one gripper, are adapted to hold the preform directly or indirectly on leaving the oven.

An intermediate system, such as the aforementioned loading/offloading means or a notched transfer wheel, may where appropriate be disposed between the transport device of the oven and said transfer device.

Such a transfer wheel generally includes a turntable driven in rotation about a vertical axis that includes circumferentially disposed notches with a "U" or "V" overall shape into which the preforms released from the support means of the transport device of the oven are introduced.

In a notched transfer wheel, each preform is supported by means of its radial collar, which bears on the perimeter of the notch, the preform being oriented vertically with the neck at the top.

The other loading/offloading means referred to above, notably with reference to the document EP-1.922.273, differ from such a notched wheel by virtue of including grippers adapted to seize the preforms on either side of their collar.

In order to prevent undesirable marking of the preform it is important that a preform is never seized or gripped by the body, especially if the preform is hot. In fact, when the preform has been heated in the oven with a view to forming it, the preform is softened and consequently sensitive to any contact.

More importantly, any transfer of heat from the preform to the gripper is also avoided at this time, any such transfer of heat being liable to impact on the subsequent operation of transforming the preform into a container.

In fact, it is a consistent feature of the prior art never to hold the junction section of the preform situated under the radial collar of the preform in order not to leave marks there, notably because of the clamping force applied by the jaws of a gripper.

Moreover, in the absence of any direct contact, there is no transfer of heat by conduction between the junction section and the transfer means, noting that any such contact would cause cooling of this area (known as "cold spots") that would afterwards impact on the elongation of the material when forming the container in the mold, for which operation control of the temperature is an essential factor.

Accordingly, the jaws of the gripper in prior art transfer devices are always positioned around the neck and this is why the support means of the oven or the intermediate means must leave the neck free so that it can be seized.

In particular, the annular groove of the neck intended for the security ring is generally the portion of the neck chosen to be seized by the jaws of the gripper.

It is therefore a given for the person skilled in the art that the jaws of the gripper must be positioned axially between the radial collar and the rim of the neck, and never on the body of the preform.

In the known solutions referred to above, the preforms are therefore either supported or held by their collar without there ever being any contact with the body of the preform.

When the neck includes a thread to enable subsequent closure of the container by a screw cap, an annular groove delimited axially by the collar and a bead is generally provided that is intended subsequently to receive a safety ring separably connected to the cap in order to guarantee to the consumer the integrity of the container (bottles, flasks, etc.) at the time of purchase.

The jaws of the gripper are then positioned around the neck, locating axially in the annular groove intended for the security ring, because the threaded portion of the neck does not enable secure seizure of the preform, which is equally the case for a container with a threaded neck.

Once the hot preform has been seized directly or indirectly by the jaws of the gripper, the preform is then transferred by the arm carrying the gripper, which pivots about the rotation axis to bring the preform into a given position relative to the mold of the machine, the mold occupying an open position and, once the preform is in position, the two shells of the mold are then moved toward a closed position.

In the closed position of the mold, the preform extends axially through a central orifice of the mold, the body of the preform extending inside the mold in a molding cavity delimited by the internal faces of the shells provided with imprints for molding the container, while the neck of the preform projects outside the mold.

To be more precise, the radial collar of the preform bears on a portion of the plane face of the mold around said central orifice through which the preform passes completely in the axial direction. The fluid under pressure can then be fed into the opening of the preform which is delimited circumferentially by the rim of the neck by means of a nozzle intended to cap said neck and to bear in sealed manner against said plane face formed by the joined shells of the mold.

It will be clear that it is again important for the jaws of the gripper to be positioned axially between the radial collar and the rim of the neck, in particular in the annular groove, failing which the gripper would not be able to transfer the preform into the mold without interference occurring between the gripper and the mold on closing the latter.

In the prior art, the transfer device is generally separate from and arranged near the machine, the molds of which are commanded to open/close synchronously to enable placement of the preform(s).

However, the prior art transfer device and embodiments that have just been described are now no longer entirely satisfactory.

To be more precise, and as is notably explained in the document WO -2008/139088 in the name of the Applicant, the search for reduced production costs has led to even further reduction of the mass of the preforms.

One consequence of this reduction of the mass of the preforms is that the heated preforms are sometimes badly positioned in the molds of the machine, leading to the production of non-conform containers that must be scrapped.

This is particularly the case with preforms having a body of very small size in the axial direction, for example, notably compared to the dimensions of the neck, which always has its final shape, to the extent that by analogy such preforms are sometimes referred to as "teats".

The applicant proposed a solution to these problems in the document WO -2008/139088, which should be referred to for more details.

According to the teachings of that document, the solution uses a manipulator clamp which, associated with the molding station of the machine, with which the clamp is constrained to move, is adapted to be moved between a raised position and a lowered position to hold the preform (or blank) by means of its jaws in order to guarantee the position of the preform relative to the mold, in particular the correct coaxial position, before and until the nozzle is lowered.

Now, such a solution requires a complete redesign of the device for transferring the heated preforms from the exit of the oven to said manipulator clamp associated with the mold.

For the reasons detailed above in connection with the jaws of the prior art gripper, the jaws of such a manipulator clamp must be positioned on the neck, notably to prevent interference on closing the mold, and are most often positioned in the annular groove that is intended for the security ring.

Consequently, it is difficult or even impossible for the jaws of a gripper of the transfer device to be able to feed the heated preform when holding it at the same place on the neck as the jaws of the manipulator clamp (in particular in the annular groove).

However, and as explained above, there is no alternative for the person skilled in the art if the junction section between the body and the neck of the preform or the neck itself, which is moreover generally provided with a thread, are not available as possible holding areas.

In the above description, the manipulator clamp is of course any clamp intended to feed the hot preform and hold it in position until the mold is closed and therefore is not limited to a clamp according to the document WO-2008/139088.

One possible solution would be to superpose axially the jaws of the grippers and the manipulator clamps, but this is not satisfactory because—apart from the risks of interference on transfer from the gripper to the clamp —almost all preforms have an annular groove that is not of sufficient height.

Moreover, such a solution requires the use of jaws having a very small thickness in the axial direction to reduce their overall size, which is notably prejudicial to correct holding of the preform, notably by the gripper, given the centrifugal force that occurs during transfer.

In fact, it should be added to the foregoing explanations that, with ever-increasing throughputs, driving rotation of the transfer device including the arms is accompanied by ever greater forces caused by centrifugal force, which forces stress in the radial direction preforms that are ever lighter and therefore ever more sensitive.

To prevent the effects of centrifugal force, and in order also to avoid the drawbacks detailed hereinafter, it is therefore necessary for the holding means of the transfer device, such as a gripper, to be able to hold the preform perfectly in position, notably in the axial direction.

To be able to satisfy such an objective with a gripper, one possible solution consists in increasing the clamping force applied radially to the preform by the jaws of the gripper so as to combat the centrifugal force.

Failing this (and without considering the portion of the preform that might be seized by the jaws), there is notably a risk of the preform being marked, in particular by any movement of the preform between the jaws, and even to be badly positioned for the transfer to the jaws of the manipulator clamp. The jaws of the manipulator clamp are then liable, on closing, to degrade the neck of the preform anyway, or even to cause a production incident at the level of the machine.

SUMMARY OF THE INVENTION

The object of the present invention is notably to remedy the aforementioned drawbacks of the prior art and to propose a transfer device able to function with any type of preform and machine necessitating the transfer of an object with a neck between a clamp and a gripper.

In fact, the reduced mass of the preforms and the ever higher production throughputs make the transfer operations difficult and especially the transfer of the heated preform between the exit from the oven and the mold of a transformation or forming machine.

A very particular, although not exclusive, object of the invention is to propose a transfer device adapted to enable gripper-clamp transfer of a hot preform, i.e. transfer between a gripper and a manipulator clamp, as much at the exit of the oven as thereafter at the entry of the machine.

According to an important feature, the jaws of the gripper each include a recess that is open in the radial direction to allow the passage of jaws of a manipulator clamp that are adapted to cooperate with the neck so that said jaws of said gripper and said jaws of the manipulator clamp are able to interpenetrate without mechanical interference when transferring the preform between them.

Thanks to such a recess, it is possible to effect a gripper-clamp transfer of the object, such as a hot preform, between a gripper and a manipulator clamp.

To this end, the invention proposes a transfer device of the type described above characterized in that the jaws of the gripper each include, respectively, a first or clamping portion adapted, in the closed position of the gripper, to cooperate with said at least a portion of the object to apply thereto a radial clamping force enabling retention of the object occupying said particular reference position in the housing of the gripper, and a second or locking portion adapted to cooperate selectively with at least a portion of the neck to hold the object in said particular reference position, and in that the first or clamping portion of each jaw of the gripper includes a support face adapted, when the gripper is closed around the object occupying said particular reference position, to cooperate with a portion of a bearing face of the radial collar that is adjacent the junction section.

The transfer device equipped with the gripper in accordance with the invention is therefore advantageously adapted to function at high throughputs, as well as being reliable and very accurate in positioning the object that is transferred from or to a manipulator clamp, always in perfect synchronism.

The transfer device conveys objects, such as preforms or containers, at very high throughputs and in a particularly reliable manner when each object is perfectly held in the particular reference position in order to be transferred to a manipulator clamp, the gripper in accordance with the invention notably ensuring accurate positioning of the annular groove of the neck (intended for the security ring) of the preform for it to be held by the jaws of said manipulator clamp.

Thanks to the shape of the jaws of the gripper of the invention, the gripper is also adapted to receive a preform transferred by a manipulator clamp the jaws of which are positioned in the annular groove of the preform.

The invention is thus notably, although not exclusively, intended to be used to carry out at least part of the transfer of a "hot" preform from the exit of the oven to the mold of a machine.

Going against the received wisdom of the person skilled in the art, the invention proposes a hot preform gripper the jaws of which notably include a first or clamping portion adapted to cooperate with the junction section between the body and the neck.

The first or clamping portion of the jaws intended to exert the radial clamping force advantageously has a given thickness that is determined for cooperation with only the amorphous area of the junction section in order to prevent marking of the body of the preform.

The first or clamping portion of the jaws of the gripper is advantageously adapted to exert the radial gripping force over a small area corresponding to the amorphous area provided that the holding of the object in the particular reference position, i.e. its immobilization, is the result of the conjugate action of the first and second portions of the jaws of the gripper, any movement of the preform being immediately blocked by the second or locking portions of the jaws.

In accordance with other features of the invention:

the second or locking portion is adapted to cooperate selectively with at least a portion of the neck axially between the rim and the collar to hold the object in said particular reference position;

the second or locking portion is adapted to cooperate selectively with at least a portion of the rim of the neck delimiting the perimeter of the opening to form at least one axial abutment adapted to hold the object in said particular reference position;

the first or clamping portion of each jaw of the gripper has a thickness determined so that, in the closed position of the gripper, the clamping force exerted by said first portion of each jaw is applied to a so-called amorphous area of the junction section that is directly adjacent the collar;

the second or locking portion of each jaw of the gripper includes at least one abutment face adapted to cooperate selectively with a portion of the neck of the object to hold said object in the particular reference position, in particular when the transfer device to which the gripper is coupled is moved to transfer the object to the manipulator clamp;

the abutment face of the second or locking portion of each jaw has an axial clearance relative to the rim of the neck of the object occupying said particular reference position;

the second or locking portion is produced in one piece with the first or clamping portion so that each jaw of the gripper constitutes a one-piece subassembly;

the jaws of the gripper are made of a plastic material, notably polyetheretherketone;

the second or locking portion of each jaw of the gripper consists of a locking arm;

the locking arms each include a frustoconical surface which is adapted on closing the gripper to cooperate with the neck to position the object in said particular reference position.

BRIEF DESCRIPTION OF THE DRAWING FIGURES

Other features and advantages of the invention will become apparent on reading the following detailed description, for an understanding of which refer to the appended drawings, in which:

FIG. 1A is a detail view that represents an example of an object with a neck and shows in a nonlimiting way a preform;

FIG. 2 is a perspective view that represents one embodiment of a gripper in accordance with the invention intended to equip a transfer device and which shows the jaws of said gripper empty and open, the first and second portions of which jaws delimit an opening for the jaws of the manipulator clamp to pass through;

FIG. 4 is a perspective view that represents the gripper in the closed position and shows a preform in the particular reference position in the housing of the gripper in which it is notably retained by the jaws;

FIGS. 5, 6 and 8 show transfer from a manipulator clamp to a gripper in accordance with the invention, as notably carried out at the exit of the oven to transfer a hot preform to a mold;

FIG. 5 is a perspective view which, showing the beginning of the transfer, represents the gripper in the open position able to receive a hot preform that has been heat conditioned in the oven, said preform being fed by a manipulator clamp the jaws of which seize the neck at the level of the annular groove;

FIG. 6 is a perspective view that represents a preform and shows the jaws of the gripper in accordance with the invention in the closed position and the jaws of the manipulator clamp received in the annular groove and consequently shows the interpenetration of the gripper and the clamp thanks to the recess in accordance with the invention;

Figure 8:
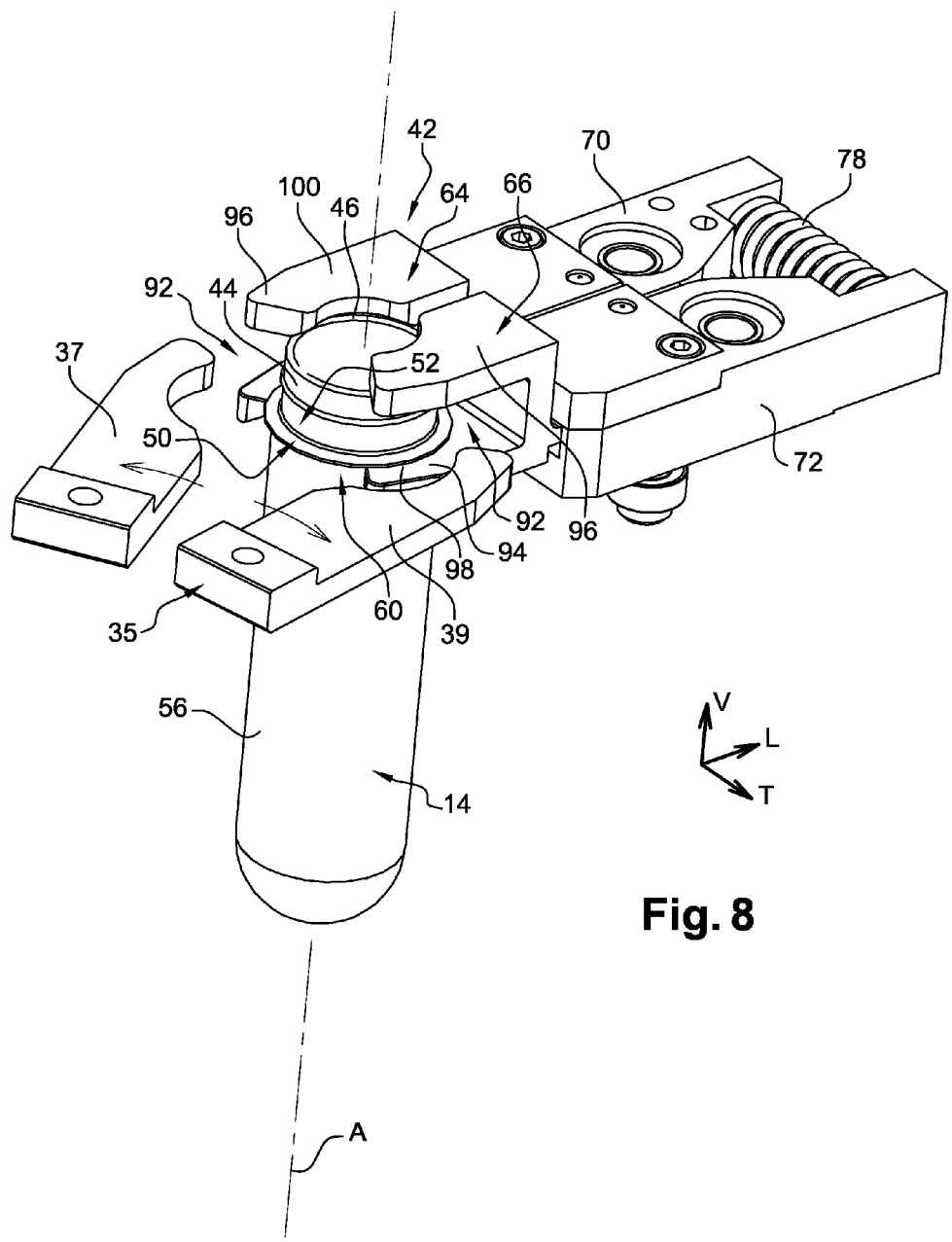

FIG. 8 is a perspective view that represents the gripper in the closed position transporting a preform with the annular groove of the neck free and, thanks to the recesses, accessible to the jaws of the manipulator clamp associated with the mold which are adapted to be positioned in said annular groove of the preform to effect a new transfer between the gripper and the clamp after transport in the downstream direction.

DETAILED DESCRIPTION OF THE INVENTION

In the following description, identical, similar or analogous items are denoted by the same reference numbers.

In the remainder of the description, the longitudinal, vertical and transverse orientations refer by way of nonlimiting example to the trihedron (L, V, T) represented in the figures.

By convention and by way of nonlimiting example the axial direction and the radial direction respectively correspond to the vertical orientation and to the plane (L, T) of the trihedron, "front" and "rear" refer to the longitudinal orientation, "upper" and "lower" refer to the vertical orientation, and finally "left" and "right" and "interior" and "exterior" refer to the transverse orientation.

"Upstream" and "downstream" refer to the direction of circulation of the stream of objects, such as preforms or containers, transferred through the manufacturing installation.

The invention concerns an object transfer device 10 that is notably intended to equip an installation 12 for manufacturing containers.

In fact, the transfer device 10 is very specifically adapted to transfer objects with a neck in the form of preforms 14 or containers 16.

In the application described by way of nonlimiting example hereinafter, the object transfer device 10 is used in the installation 12 to transfer preforms 14 from the exit of a heat-conditioning oven 18 to one of the molding stations $M_i$ of a machine 20, for example a blowing or drawing-blowing machine.

Here the machine 20 is of the "rotary" type and includes a carousel 22 mounted to be mobile in rotation about a vertical rotation axis O and provided circumferentially with a plurality of molding stations ($M_1$, $M_2$, $M_3$, . . . $M_i$), each station notably including a mold 24.

Each molding station advantageously includes a manipulator clamp 25 permanently associated with the mold 24.

The manipulator clamp 25 includes two jaws 26 and 28, at least one of which is mounted to be mobile between two positions respectively corresponding to an open state and a closed state of said clamp 25 for manipulating the preform 12.

As indicated above such a molding station is more particularly described in the document WO-2008/139088 which should be referred to for more details.

Each molding station $M_i$ includes a nozzle (not represented here) associated with the mold 24 to form a container 16 from a preform 14 previously heat-conditioned in the oven 18, for example.

The oven 18 primarily includes heating means 30 associated with ventilation means 32, the preforms 14 being conveyed through the oven 18 along a given heating path by means of a transport device 34.

To this end the transport device 34 includes an endless chain driven by drive means 36, for example, which supports a plurality of means 38 for supporting a preform 14, also sometimes known as "whirlers", the arrangement of said support means 38 determining the pitch between two consecutive preforms 14.

The installation 12 preferably includes a first transfer device 27, which first transfer device 27 is here a wheel provided circumferentially with notches 29 each adapted to receive a preform 14.

The wheel forming the first transfer device 27 is driven in clockwise rotation about a vertically oriented central axis, i.e. in the direction opposite to that of the movement of the transport device 34 of the oven 18 including the means 38 for supporting the preforms 14.

The installation 12 preferably includes, on the downstream side of the first transfer device 27, a second transfer device 31 that is driven in anticlockwise rotation about a vertically oriented central axis, i.e. in a rotation direction opposite that of the first transfer device 27.

Here the second transfer device 31 includes transfer arms 33 each provided with a manipulator clamp 35 and mounted to be mobile in rotation about a vertical rotation axis of the device 31.

Each manipulator clamp 35 includes jaws 37 and 39 adapted to seize the neck of the hot preform 14 and more particularly an annular groove of the neck so that, after it is stripped from the support means 38 of the transport device 34 in the oven 18, the hot preform 14 is successively transferred first by rotation of the notched wheel forming the first transfer device 27 and then, after a first transfer of the hot preform 14 between said wheel and the second transfer device 31, by rotation of the transfer arm 33 carrying the clamp 35 as far as the transfer device 10.

The transfer device 10 preferably includes a plurality of transfer arms 40 that are mounted to be mobile in rotation about an axis O1 and each of which is provided at its free end with a gripper 42 for holding an object, here such as a "hot" preform 14 ready to be transformed into a container 16 in the machine 20.

The installation 12 advantageously includes another transfer device 10' which, in an analogous manner to the previous device 10, is intended to transfer in the downstream direction the containers 16 produced by the machine 20 from the hot preforms 14 coming from the oven 18.

There is represented on the downstream side of the transfer device 10' a system for conveying the containers 16 that is adapted to feed the containers 16 to another machine including at least one filling station and one capping station, for example.

Alternatively, the transfer device 10' preferably feeds directly or indirectly at least one such machine for at least filling the containers 16.

The system for conveying the containers 16 situated on the downstream side of the transfer device 10' is preferably similar to the transfer devices 10 and 10'.

The transfer device 10' includes a plurality of transfer arms 40' that are mounted to be mobile in rotation about an axis O1' in the clockwise direction, i.e. in a rotation direction opposite that of the carousel 22 of the machine 20.

Each of the transfer arms 40' is provided at its free end with a gripper 42 for holding an object, here such as a container 16 obtained after transformation of a preform 14.

Thanks to the gripper in accordance with the invention, each gripper 42 of the transfer device 10' is able to seize a container 16 held in position by a manipulator clamp the jaws of which are positioned in an annular groove that the neck of the container 16 includes.

Figure 1:
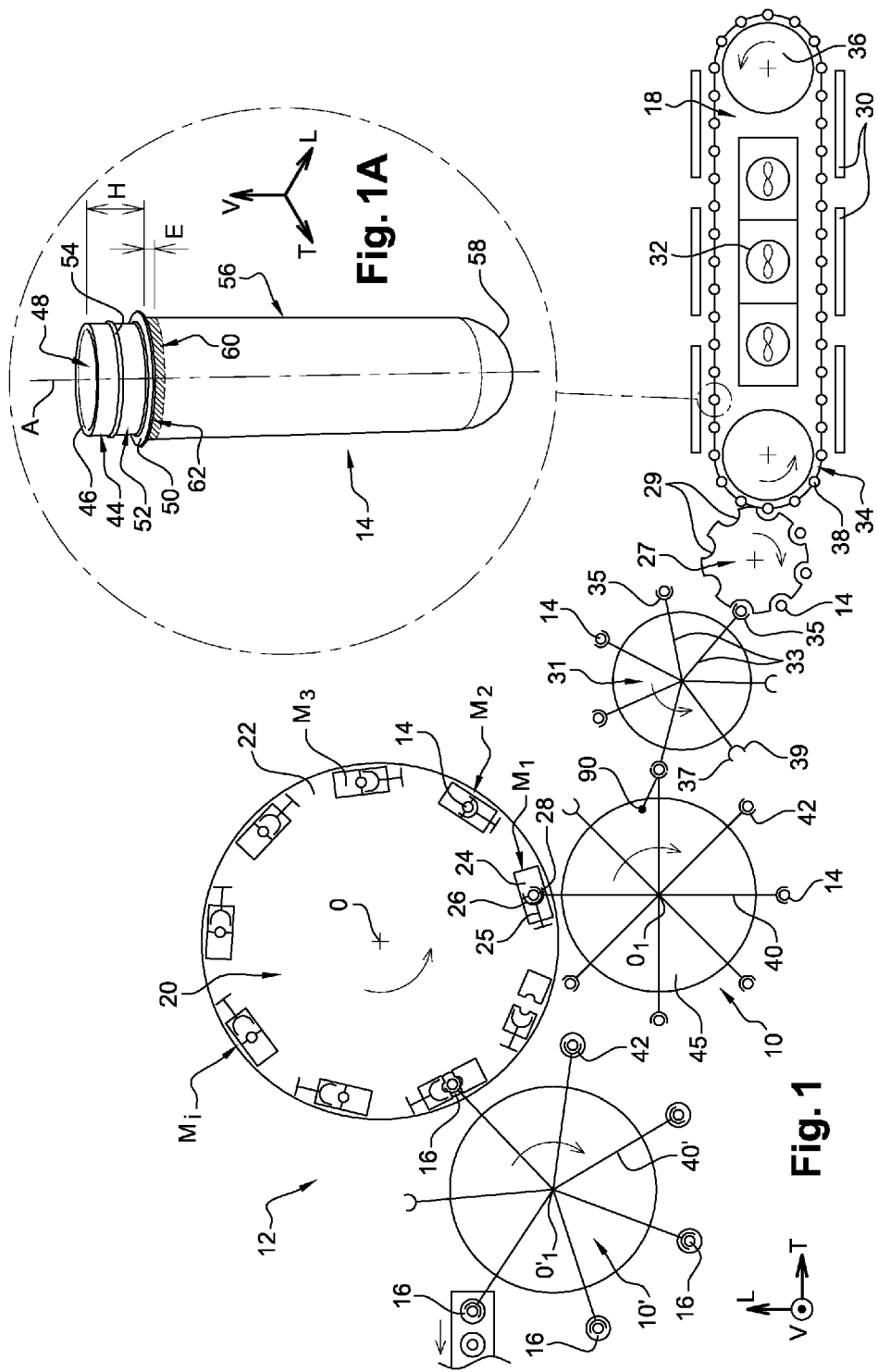
FIG. 1 is a plan view that represents diagrammatically part of an installation for manufacturing containers and shows a preferred application of a transfer device in accordance with the invention, which is disposed downstream of the exit of an oven for feeding a blowing type machine by carrying out at least part of the transfer of the heat-conditioned preforms from one to the other.

FIG. 1 is a view to a larger scale of a preform 14 the shape and the dimensions of which are given by way of nonlimiting example as the preforms 14 are liable to vary greatly in this respect.

The preform 14 (also known as a blank) has an axis A extending vertically in the axial direction and includes a first part having its final shape that consists of a neck 44 provided with a rim 46 delimiting a recess 48 and at least one annular collar 50 projecting radially.

The preform 14 (or container 16) can be supported by means of its annular collar 50, notably to transport it.

The preform 14 is preferably of the type including an annular groove 52 that is intended subsequently to receive a safety ring and is delimited axially by an upper face of the collar 50 and a bead 54.

In the example shown, the neck 44 has no thread on its exterior surface, such a neck 44 of a preform 14 corresponding in known manner to containers (bottles) used notably for packaging culinary oils.

In a variant that is not represented, in order to enable subsequent closure of the container 16 by a screw cap the neck 44 includes a thread on the section of the neck extending axially between the bead 54 and the rim 46.

The preform with the principal axis A includes a second part consisting of a hollow body 56 extending axially away from the opening 48 of the neck 44 from a junction section 60 as far as a bottom 58, said junction section 60 being adjacent a bearing face 62 of the collar 50.

The preforms 14 and the containers 16 have the important particular feature of having the same neck because the neck already has its final shape in the preform 14, which is why a gripper 42 in accordance with the invention is adapted to seize either a preform 14 or a container 16 to transfer it.

Although the gripper 42 is adapted to seize a container 16 or a preform 14, and more particularly a "hot" preform leaving the oven 18, a prior art gripper that seizes the neck of a container 16 is not suitable for seizing a "hot" preform 14.

In fact, as explained in the above preamble, it is a given for a person skilled in the art that such a hot preform 14 constitutes a special case of an object to be transferred.

A "hot" preform 14 is a singular object in the sense that the body 56 cannot be seized by a gripper or a clamp without the jaws thereof, on gripping it, penetrating into the material softened by heating and irreversibly leaving marks therein, which applies in particular to the junction section 60.

Of course, the presence of such marks is unacceptable for the quality of the finished container 16 which this esthetic defect would cause to be scrapped.

This is why, in the prior art solutions, a hot preform 14 is always either supported by its collar 50 or seized only by the neck 44.

Figure 2:
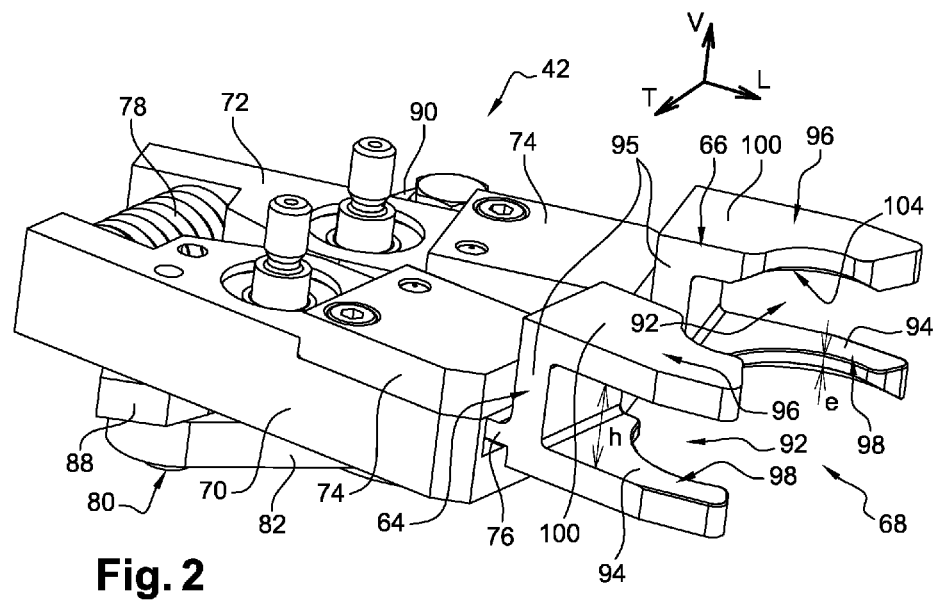

FIG. 2 shows one embodiment of a gripper 42 adapted to be mounted on and fastened to one of the transfer arms 40 of a transfer device 10, notably to transfer such a hot preform 14 in the application chosen to illustrate the invention.

As indicated above, a gripper 42 of the invention is also liable to be mounted on and fastened to one of the transfer arms 40' of the transfer device 10' in order to effect an operation of transferring containers 16 leaving the machine 20.

The gripper 42 includes at least one first jaw 64 and one second jaw 66 delimiting between them a housing 68 adapted to receive a portion of said object, to be more precise here at least the neck 44 of the preform 14.

The jaws 64 and 66 of the gripper 42 are advantageously symmetrical with respect to a longitudinally oriented vertical plane and the same references are therefore used to designate the same functional portions of each of the jaws 64 and 66.

Figure 3:
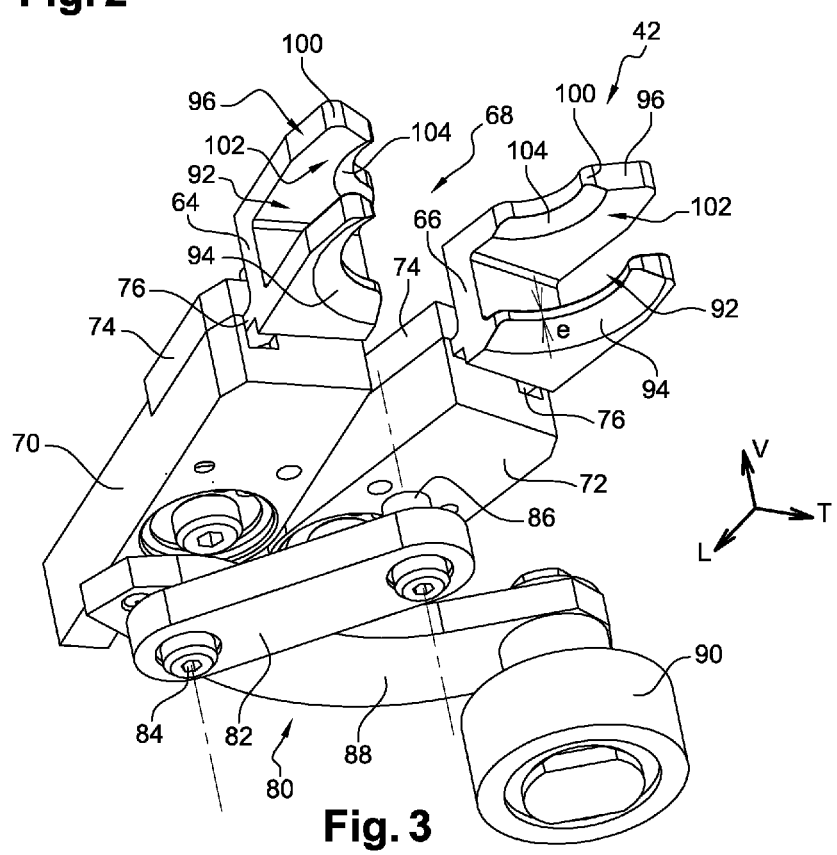
FIG. 3 is a perspective view that represents the gripper from FIG. 2 from below and shows the means commanding opening of the jaws of the gripper against a member spring-loading the jaws towards the closed position of the gripper.

The gripper 42 is able to occupy at least one open position shown in FIGS. 2 and 3 in which the object, here a preform 14, can be extracted from or introduced between the jaws 64, 66 to occupy a particular reference position in the housing 68.

The gripper 42 is also able to occupy a closed position shown in FIG. 4 in which said jaws 64, 66 cooperate with at least a portion of the object in said particular reference position.

The two jaws 64 and 66 are preferably mounted to be mobile, here in rotation, for example, so that the jaws 64, 66 are selectively able to move away from each other or toward each other so that the gripper 42 occupies said open and closed positions, respectively.

Alternatively, only one of the jaws 64, 66 is mounted so as to be mobile and the other jaw is fixed. A further alternative is for the jaws 64 and 66 to be mounted so as to be mobile in translation, not in rotation.

The gripper 42 includes two levers 70 and 72 to a free front longitudinal end of each of which one of the jaws 64, 66 is fixedly attached by means 74 for fixing the jaws 64, 66 adapted to clamp a fixing lug 76 that extends longitudinally toward the rear of the jaw.

Advantageously, only the jaws 64, 66 of a gripper 42 therefore need to be changed to adapt to a new manufactured object, necessitating changing the jaws as a function of the diameter of the neck 44 of the object 14 or 16, for example.

The gripper 42 advantageously includes a spring-loading member 78, here a coil spring, which is arranged between the levers 70 and 72 at the rear longitudinal end.

The spring-loading member 78 preferably urges said levers 70 and 72 and therefore the jaws 64 and 66 fixedly attached to the levers toward the closed position of the gripper 42 so that the clamp 42 is closed automatically and it is necessary to command only opening thereof against said spring-loading member 78.

To this end, the gripper 42 includes a mechanism 80 for commanding opening of the jaws 64 and 66 that is adapted to act selectively on the levers 70 and 72 to cause them to move away from each other, from the closed position to the open position, against the spring-loading force exerted on said levers 70 and 72 by the member 78.

The prior art includes numerous mechanisms associated with the grippers and clamps adapted to command opening and/or closing thereof, notably against or with the assistance of a spring-loading member.

Where appropriate, the gripper further includes a device for locking the mechanism as described in the document WO-2008/132090, for example, which device is adapted to lock the means for actuating the mechanism to hold the gripper in one or the other of the open and closed positions.

Consequently, the actuating mechanism 80 and the numerous possible variants of such a mechanism will not be described in detail.

In the example shown in the figures, the gripper 42 is of the commanded type, i.e. a gripper actuated by such an actuating mechanism 80 to obtain selectively one of the open or closed positions.

However, the clamp 42 in accordance with the invention is in no way limited to this example and could notably not include any such actuating mechanism 80.

In a variant that is not represented, the gripper 42 is a "clip" type gripper, i.e. a gripper in which the opening of the jaws from the closed position to the open position is caused by the (forcible) introduction of the preform 14 itself, in order to cause the jaws of the gripper to move apart against a spring-loading member urging said jaws towards the closed position.

As can be seen better in FIG. 3, the actuating mechanism 80 here includes a link 82 the ends of which rotate about respective pivots 84 and 86, the link 82 being adapted to be actuated selectively by an actuator member 88 in order to move the levers 70 and 72 apart against the spring 78.

Here the actuator member 88 is connected at one of its ends to the pivot 84 about which the link 82 is articulated to the lever 70 and includes at its free other end a cam, here taking the form of a roller 90.

The roller 90 is intended to cooperate with a cam surface (not represented) carried by a plate 45 (see FIG. 1) of the transfer device 10 so as to act selectively on the roller 90, as a function of the angular position of the transfer arm 40 relative to the axis O1, to cause movement of the actuator member 88 and therefore of the link 82 and subsequently to command opening of the jaws 64, 66 of the gripper 42.

As long as the force exerted on the roller 90 fastened to the actuating member 88 to cause the gripper 42 to open is greater than the return force exerted by the spring 78 on the levers 70 and 72, the jaws 64, 66 are held apart and the gripper 42 is in the open position.

Accordingly, the plate 45 of the transfer device 10 can, to load the roller 90 and command opening of the gripper 42 by means of the mechanism 80, include a cam surface facing the transfer device 31 on the side of the exit from the oven 18, i.e. at the beginning of the transfer, and facing the molding station at the end of the transfer, the spring-loading member 78 holding the gripper 42 in the closed position between the beginning and the end of the transfer.

Thanks to this, a portion of the preform 14 can be introduced into or extracted from the housing 68 delimited circumferentially by the jaws 64 and 66, according to its location along the transfer path.

Here the transfer path extends from the exit of the oven 18, where the hot preform 14 is first transferred by the notched wheel 27 before being seized by a manipulator clamp 35 of the transfer device 31 and then fed by a gripper 42 of the transfer device 10 to the machine 20, where the preform 14 is then transferred to a manipulator clamp 25.

A preferred embodiment of the jaws 64, 66 of the gripper 42 in accordance with the invention is described hereinafter.

The jaws 64, 66 of the gripper 42 each include a recess 92 that is open radially to enable passage of the jaws 26, 28; 37, 39 of a manipulator clamp 25; 35 that are intended to cooperate with the neck 44 so that said jaws 64, 66 of the gripper 42 and said jaws 26, 28; 37, 39 of the manipulator clamp 25; 35 are able to interpenetrate without mechanical interference during transfer of the object 14 or 16 between them.

Accordingly, the jaws 64 and 66 of the gripper 42 each include a respective recess 92 that is open radially to allow inward or outward passage of the jaws of one of the manipulator clamps 25 or 35.

The jaws of the manipulator clamps 25 and 35 are in particular intended to be received in the annular groove 52 to seize the hot preform 14 to be transferred from the oven 18 to one of the molds 24 of the machine 20.

The jaws 64, 66 of the gripper 42 are advantageously adapted to transfer a preform 14 between gripper and clamp or vice versa.

In the case of the application described here, the jaws 64, 66 of the gripper 42 are adapted to receive a hot preform 14 from the jaws 37 and 39 of a manipulator clamp 35 of the transfer device 31 (arranged at the exit from the oven 18 on the downstream side of the notched wheel 27) or, after transporting it over a given path, to transfer the same hot preform 14 to the jaws 26, 28 of another manipulator clamp 25.

Thanks to the recess 92 with which each jaw 64 and 66 of the gripper 42 is provided, the jaws of the manipulator clamps 25 and 35 are able to co-operate with the neck 44, notably the annular groove 52, of a preform 14 when the preform 14 is held by the jaws 64, 66 of the gripper 42.

In fact, said jaws 64, 66 of the gripper 42 and said jaws 26, 28; 37, 39 of the manipulator clamp 25; 35 are able to interpenetrate with no mechanical interference, here during transfer of said hot preform 14 from the manipulator clamp 35 to the gripper 42 and then from the gripper 42 to the manipulator clamp 25.

The jaws 64, 66 of the gripper 42 advantageously each include a respective first or clamping portion 94 adapted, in the closed position of the gripper 42, to cooperate with said at least one portion of the preform 14 to apply thereto a radial clamping force to enable retention of the preform 14 occupying said particular reference position in the housing 68 of the gripper 42.

The jaws 64, 66 of the gripper 42 advantageously each further include a respective second locking portion 96 adapted to cooperate selectively with at least one portion of the neck 44 to hold the preform 14 in said particular reference position.

The particular reference position advantageously corresponds to a position in which the principal axis A of the preform 14 is coaxial with the axis X of the jaws 64, 66 of the gripper 42 or the jaws of the manipulator clamp 25 or 35 so that the transfer is effected accurately, the preform 14 being in a perfectly vertical position and the gripper 42 and the clamps 25 or 35 being coplanar.

The jaw 64 of the gripper 42 has the overall shape of a "U" lying on its side, including a first or clamping portion 94 lying under the second or locking portion 96, said portions 94 and 96 of the jaw 64 being separated axially from each other by a recess 92 of height "h", as are the portions 94 and 96 of the other jaw 66 of the gripper 42.

The first and second portions 94, 96 of each of the jaws 64, 66 are connected by a vertically oriented connecting portion 95 from which extends longitudinally toward the rear the lug 76 for fixing the gripper 42 to the levers 70, 72.

The first or clamping portion 96 of each jaw 64, 66 of the gripper 42 advantageously has a thickness "e" determined so that, in the closed position of the gripper 42 (see FIG. 4), the clamping force exerted by said first portion 94 of each jaw 64 and 66 is applied to a well-defined and so-called amorphous area of the junction section 60 that is directly adjacent the collar 50.

The amorphous area of the preform extends axially over a height "E" that is greater than or substantially equal to the thickness "e" of the first or clamping portion 94 of each jaw 64, 66 of the gripper 42.

The so-called amorphous area, shown shaded (see the shaded area under the collar 50 in FIG. 1A) corresponds to all or a portion of the junction section 60 between the body 56 and the neck 44.

The amorphous area of the preform 14 is particularly difficult to heat condition in the oven 18 because it is adjacent the collar 50 of the neck 44 which, it will be remembered, in contrast to the body 56, requires action to prevent it from being heated in order for it to be able to retain its final shape.

For heat conditioning and forming, the presence of such an amorphous area is a serious disadvantage since there is concentrated there a large quantity of material that is not usable or less usable in the final container 16, notably because it cannot be drawn by the fluid under pressure.

The design of the jaws 64, 66 of the gripper 42 with clamping portions 94 of small thickness "e" advantageously exploits the presence of such an amorphous area the material of which, which is not softened or not very much softened, constitutes an area over which a radial clamping force may be applied with less risk of marking by the portions 94 of the jaws 64, 66.

The invention goes against the received wisdom of the person skilled in the art by using the gripper 42 to seize a hot preform 14 at the level of the junction section 60 between the body 56 and the neck 44.

The invention goes against the received wisdom of the person skilled in the art firstly because it is a given that such seizing of a hot preform 14 is of a kind to cause the appearance of marks resulting from the clamping force applied by the jaws of the gripper.

Now, it is precisely at the level of the junction section 60 between the body 56 and the neck 44 that the clamping portion of each jaw of the gripper 42 applies a clamping force.

Thanks to the fact that each jaw 64, 66 of the gripper 42 also includes a second or locking portion 96, it is in fact possible to optimize the radial clamping force applied by the first or clamping portion 94 of each jaw 64, 66 without this compromising the proper retention of the preform 14 in said particular reference position.

Moreover, the gripper 42 is advantageously made from a non-metallic material, preferably a plastic material such as polyetheretherketone (also known as PEEK).

In fact, a clamp 42 made from such plastic materials has, compared to metals such as steel, a lower hardness and consequently a smaller difference in hardness relative to the material constituting the preform 14, such as PET.

The invention then goes against the received wisdom of the person skilled in the art because it is a given that such seizing of a hot preform 14 is also and above all of a kind such as to cause the appearance of the aforementioned "cold spots" that result from the transfer of heat by conduction between the parts in contact of the preform 14 and the gripper 42.

In fact, it will be remembered that the junction section 60 between the body 56 and the neck 44 of the preform 14 is a part that is difficult to heat both during heat conditioning in the oven 18 and thereafter during drawing in the transformation machine 20 to obtain a container 16.

Notably in comparison with the metals such as steel employed before, at least the material used for the clamping portion 94 of each jaw 64, 66 of the gripper is advantageously a material that preferably has a low thermal conductivity so as to limit thermal exchanges.

Thanks to the use of materials of low thermal conductivity, like plastic materials such as PEEK, as opposed to metals such as steel, thermal exchanges are reduced between, on the one hand, the hot preform 14 and the gripper 42 and, on the other hand, the gripper 42 and the surrounding air, so as to increase further the temperature difference between the gripper 42 and the hot preform 14.

In fact, large air movements occur in such an installation 12, notably because of the rotation of the carousel 22 of the machine 20 at high speed and/or the use of systems for insufflation of filtered air intended to establish an increased pressure inside an enclosure disposed around the fabrication means of the installation 12 in order to limit the risk of contamination of the objects 14, 16 during the manufacturing process.

The first or clamping portion 94 of each jaw of the gripper 42 includes a support face 98 intended to cooperate with a portion of the bearing face 62 of the radial collar 50 that is adjacent the junction section 60 when the gripper 42 is in the closed position around the preform 14 occupying said particular reference position.

In a variant that is not represented, the first or clamping portion 94 of each jaw 64, 66 of the gripper 42 includes a respective notch which, delimited radially by a vertical rim, has a shape complementary to at least a portion of the collar 50 that is intended to be received therein when the gripper 42 is in the closed position around the preform 14 occupying said particular reference position.

The depth of the notch is preferably less than the total thickness of the collar 50 to limit the risk of interference with the jaws of one of the manipulator clamps 25 or 35 positioned axially in the annular groove 52 during a gripper to clamp transfer or vice versa.

The preform 14 is advantageously immobilized at least axially by the second or locking portion 96, which tends to maintain or maintains the bearing face 62 of a collar 50 in permanent contact with the support face 98 of the first portion 94 of each jaw 64 and 66.

The second or locking portion 96 is adapted to cooperate selectively with at least a portion of the rim 46 of the neck 44 delimiting the perimeter of the opening 48 to form at least one axial abutment adapted to hold the preform 14, or alternatively a container 16, in said particular reference position.

In a variant that is not represented, the second or locking portion 96 is adapted to cooperate selectively with at least a portion of the neck 44 that lies axially between the rim 46 and the collar 50 to hold the object 14, 16 in said particular reference position.

In accordance with this variant, the second or locking portion 96 is in permanent contact with said portion of the neck 44 or spaced from the latter by a given clearance.

The fact that the second or locking portion 96 cooperates selectively with a portion of the neck 44 that lies axially between the rim 46 and the collar 50 (with the exception of the portion such as the groove 52 intended for the manipulator clamp 35) advantageously makes it possible to avoid all contact with the rim 46 of the neck 44.

The second or locking portion 96 of each jaw 64, 66 of the gripper 42 preferably consists of a locking arm 100 having an abutment face 102 adapted to cooperate selectively with a portion of the neck 44 of the preform 14 to hold it in the particular reference position, especially when the transfer device 10 to which the gripper 42 is connected is moved, following a first transfer from the manipulator clamp 35, to effect a second transfer of the hot preform 14 to the manipulator clamp 25.

The abutment face 102 is preferably plane and preferably lies in a globally horizontal plane.

The abutment face 102 of the second or locking portion 96 of each jaw 64, 66 advantageously has an axial clearance "j" relative to the rim 46 of the neck 44 of the preform 14 occupying said particular reference position.

To this end, the value of the height "h" of the recess 92 (see FIG. 2) corresponding to the axial dimension between the support face 98, here at the top, of the first or clamping portion 94 and the abutment face 102, here at the bottom, of the second or locking portion 96 is made greater, by at least the value of the axial clearance "j", than the axial dimension "h" of the neck 44 of a preform 14 shown in FIG. 1A.

Thanks to this axial clearance "j", the rim 46 of the neck 44 is protected in that it is not in permanent contact with the abutment face 102 which is then able to exert thereon a locking force oriented axially downward.

Alternatively, the abutment face 102 of the second or locking portion 96 of each jaw 64, 66 is in permanent contact with the rim 46 of the neck 44 of the preform 14 occupying said particular reference position.

In a variant that is not represented, the abutment face 102 is a portion of a mobile part connected to the second portion 96 of the gripper 42 with the possibility of relative movement, in particular here at least in the axial direction so as to be able to take up a clearance relative to the rim 46 of the neck 44 of the preform 14.

The abutment face 102 is preferably a portion of a part made from a deformable material, such as an elastomer, or alternatively connected to the second portion 96 of the gripper 42 with a spring member such as a spring between them.

Accordingly, the second or locking portion 96 is adapted either to block selectively the neck 44 of the preform 14 when the latter leaves the particular reference position or to cooperate permanently with the rim 46 to block the preform 14 in conjunction with the first or clamping portion 94 the face 98 of which immobilizes the preform 14 axially via its collar 50.

The second or locking portion 96 is preferably made in one piece with the first or clamping portion 94 so that each jaw 64, 66 of the gripper 42 constitutes a one-piece subassembly.

This advantageously improves control of the dimensions of the functional surfaces of the jaws 64, 66, in particular the axial dimension of the recess 92 between the support face 98 and the abutment face 102.

The jaws 64 and 66 of the gripper 42 are advantageously made from plastic material, notably from polyetheretherketone (also known as PEEK).

The use of such a non-metallic material limits heat transfer between the jaws 64, 66 of the gripper and the preform 14, i.e. the aforementioned phenomenon of "cold spots".

This use of a plastic material advantageously makes it possible to mold the jaws 64, 66 of the gripper 42 in one piece with great precision.

The locking arms 100 preferably each include a frustoconical surface 104 which is adapted to cooperate with the neck 44 on closing the gripper 42 to facilitate the positioning of the preform 14 or a container 16 in said particular reference position.

The operation of the transfer device 10 is described next with reference to FIGS. 5 to 8 in the particular application indicated above, i.e. firstly for a clamp to gripper transfer on seizing a hot preform 14 coming from the oven 18 to transport it to the machine 20 and secondly for a gripper to clamp transfer of said hot preform 14 to a manipulator clamp 25.

As can be seen in FIGS. 1 and 5, after stripping it from the support means 38 of the transport device 34 in the oven 18, and following a first transfer by the notched wheel 27, the hot preform 14 is held in a vertical position by the jaws 37 and 39 of the manipulator clamp 35 of the transfer device 31.

The transfer arm 33 carrying at its free end the manipulator clamp 35 the jaws 37 and 39 of which are accommodated in the annular groove 52 of the preform 14 is then driven in rotation about the vertical rotation axis of the device 31 until it is positioned facing the gripper 42, which is in the open position.

The gripper 42 is fastened to one of the transfer arms 40 of the transfer device 10 and the transfer devices 10 and 31 are synchronized so that the gripper 42 and the manipulator clamp 35 effect the transfer of the hot preform 14 from the one to the other.

The gripper 42 is commanded to open by way of the mechanism 80 so as to occupy its open position when it encounters the manipulator clamp 35 transporting the preform 14, as shown in FIG. 5.

Thanks to the recess 92 that each jaw 64 and 66 of the gripper 42 includes, the jaws 37 and 39 of the manipulator clamp 35 are able to interpenetrate without impact, said jaws 37, 39 penetrating longitudinally from the front toward the rear into the housing 68 delimited by the jaws of the gripper 42 in its open position, until the preform 14 reaches the particular reference position in which its principal axis A is coaxial and advantageously coincident with the vertical axes of the jaws 64 and 66 of the gripper 42 and the jaws 37, 39 of the clamp 35.

Figure 6:
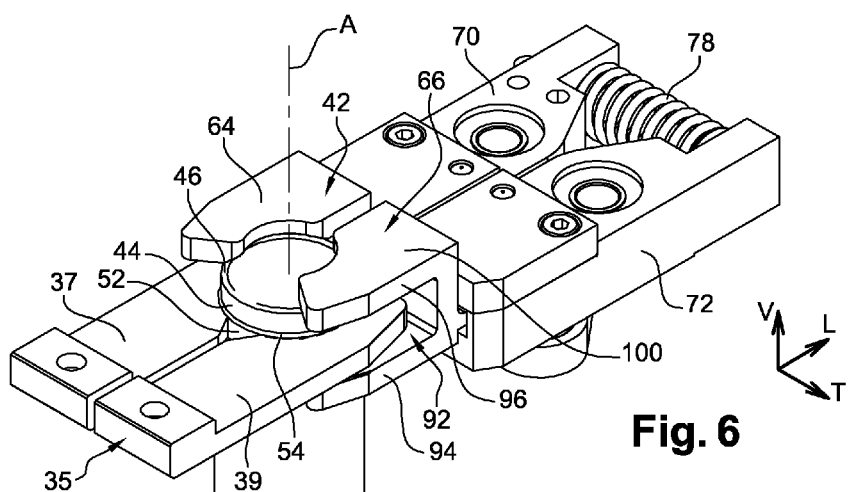

As shown in FIG. 6, at a particular point between the transfer devices 10 and 31 the transfer arm 33 carrying the manipulator clamp 35 is radially aligned with the transfer arm 40 carrying the gripper 42, the manipulator clamp 35 and the gripper 42 interpenetrating one another around the preform 14.

At this moment, the mechanism 80 associated with the gripper 42 is commanded to cease to exert a force on the roller 90 carried by the actuator member 88 of the link 82 so that the spring-loading force exerted by the spring 78 then causes and the jaws 64 and 66 to close automatically around the preform 14.

Figure 7:
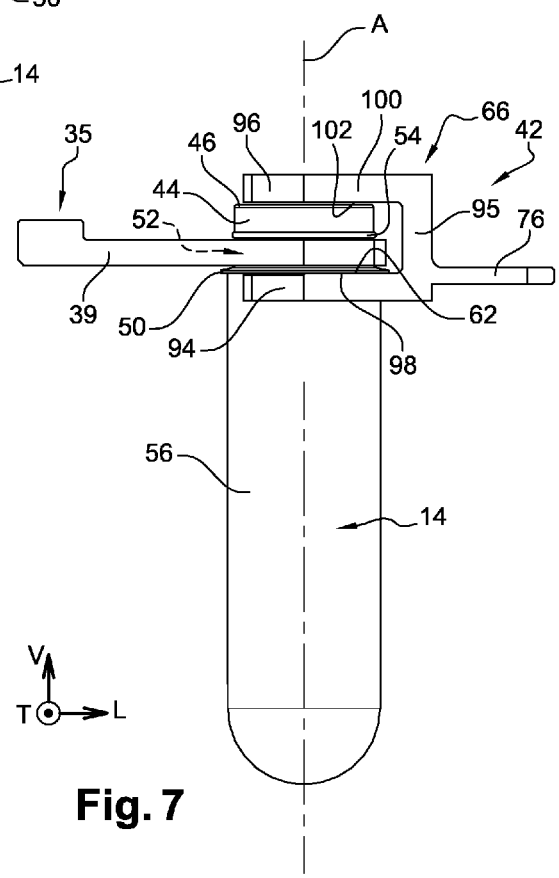
FIG. 7 is a side view of FIG. 6 that represents the respective axial positions of the gripper and the clamp relative to each other and to the neck of the preform.

As can be seen in FIGS. 6 and 7 in particular, the jaws 37 and 39 of the manipulator clamp 35 are positioned axially in the annular groove 52 while the first or clamping portions 94 of each jaw 64 and 66 of the gripper 42 are positioned in the amorphous area of the junction section 60, just below the collar 50, and the second portions 96 formed by the locking arms 100 are simultaneously positioned in vertical alignment with the rim 46 of the neck 44 of the preform 14.

The gripper 42 then holds the preform 14, which is advantageously supported by the support face 98 of the first or clamping portion 94 of each jaw 64, 66 against which the bearing face 62 of the collar 50 rests so that, apart from the radial clamping force exerted by the jaws 64, 66 on the amorphous area, the preform 14 is also supported axially by way of its collar 50.

The second or locking portion 96 formed by the locking arms 100 cooperates or not according to whether an axial clearance "j" is present between the abutment face 102 and the rim 46 of the neck 44.

Opening of the jaws 37, 39 of the manipulator clamp 35 is then preferably commanded, for example by means of a actuating mechanism associated with the clamp 35, to release the preform 14 held from now on only by the jaws 64 and 66 of the gripper 42, so completing the first transfer of the hot preform 14.

Alternatively, the manipulator clamp 35 does not include any mechanism to command its opening and/or closing and it is the preform 14 itself that causes the jaws 37, 39 to open against a spring-loading member urging said jaws 37, 39 toward the closed position.

In fact, because the neck 44 of the preform is not heated in the oven 18 and because the annular groove 52 is intended to receive subsequently a security ring, it is possible to simplify the design of the manipulator clamp 35, the preform 14 then being forcibly inserted into or extracted from the jaws 37, 39, this being referred to above as a "clip" type clamp as opposed to a commanded opening clamp.

As can be seen in FIG. 8, the manipulator clamp 35 the jaws 37, 39 of which are in the open position then totally releases the preform 14, which is transported by the transfer arm 40 of the transfer device 10 with which said gripper 42 is constrained to move.

Rotation of the transfer arm 40 about the axis O then transports the hot preform 14 to the machine 20, where the hot preform 14 will then be transferred a second time, from the gripper 42 to a manipulator clamp 25.

Said manipulator clamp 25 is preferably a clamp associated with the molding station and therefore mounted on the machine 20 of the type described and shown in the document WO-2008/139088.

There is no need to describe in detail the second transfer of the hot preform 14 from the gripper 42 to the manipulator clamp 25 given that any such transfer is analogous to the first transfer that has just been described except that it is effected in reverse order.

Consequently, a chronological illustration of such a second transfer is obtained simply by reversing the order of the figures, the transfer beginning in FIG. 8 with the preform 14 held by the gripper 42 to end in FIG. 5 with the preform 14 held by the jaws 26 and 28 of the manipulator clamp 25.

For what happens next and for more details reference may again be made to the document WO-2008/139088 which describes the placing of the preform 14 in the mold 24 by such a manipulator clamp 25 after its transfer from said gripper 42 of the transfer device 10.

A gripper 42 in accordance with the invention is advantageously adapted to be used to carry out different transfer operations within an installation 12 for manufacturing containers 16, both of hot preforms 14 from the exit of the oven 18 to the machine 20 as just described and at the exit of this machine 20 of the containers 16 by a transfer device 10'.

Other container transfers are sometimes effected to carry out directly afterwards the filling of the containers 16 and the closing, for example capping, of the filled containers 16.

For example, the grippers in accordance with the invention could also be used to divide a stream of objects, such as preforms or containers, notably to effect splitting.

In fact, because the neck 44 of the preform 14 has its final shape and is identical to the neck of the container 16, the grippers 42 are then adapted to seize interchangeably by the neck 44 either a preform 14 or a container 16, notably to carry out transfers.

Of course, the embodiment of the jaws 64 and 66 of the gripper 42 that has just been described is in no way limiting on the invention, and the second or locking portion 96 could in particular be produced in form other than locking arms 100 fastened to the first or clamping portion 94.

In a variant that is not represented, the second or locking portion 96 of the gripper 42 consists of at least one locking member which is either fixed or mobile between a retracted position and a locking position and is independent of the first or clamping portion 94 of the jaws 64, 66.

The second or locking portion 96 of the gripper 42 consists for example of at least one fixed locking member, such as a horizontal plate, which has a locking face with which at least a portion of the neck 44 axially between the rim 46 and the collar 50 or a portion of the rim 46 of the neck 44 of the object (preform 14 or container 16) cooperates when said object occupies a particular reference position.

As previously, the locking member can be positioned so that there is a particular axial clearance relative to the neck 44 so that, with no permanent contact, at least a portion of the neck 44 of the object, such as a portion of the rim 46, abuts selectively against said face to hold the object in said particular reference position.

This achieves an optimum transfer, including when the transfer device is moved, vibrations or the effects of centrifugal force then as previously being liable to cause the object to depart the particular reference position.

In accordance with another example, the second or locking portion 96 of the gripper 42 consists of at least one member mobile between a retracted position in which said member is retracted, notably to facilitate the introduction of the object 14, 16 into a central housing delimited by the gripper 42, and a locking position in which said element is adapted to cooperate with the neck 44 to block the object 14, 16 occupying said particular position in the axial direction.

Said at least one locking member is preferably mounted to be mobile in translation in the axial direction and commanded selectively to move between said retracted and locking positions.

Alternatively, said at least one locking member is mounted to be mobile in rotation about a pivot axis orthogonal to the axial direction and commanded selectively to move between said retracted and locking positions.

The embodiment in the form of arms 100 shown in the figures has various advantages over the variants of the second or locking portion 96 that have just been described.

In fact, because the transfer arms 100 are fastened to the first or clamping portion 94, actuation of the jaws 64, 66 between the open and closed positions of the gripper 42 is simple to command because it is simultaneous, and therefore perfectly synchronous, and facilitates placement of the other manipulator clamp, whether carrying the preform 14 or not. Moreover, the opening 48 of the preform 14 remains accessible between the locking arms 100.

The invention claimed is:

1. A device (10) for transferring objects, said transfer device (10) comprising:
 a gripper (42) that that transfers objects, including preforms (14) or containers (16), said objects comprising i) a neck (44) having a distal first end provided with a rim (46) delimiting an opening (48), and a second end provided with a radially projecting annular collar (50) having a bearing face (62), ii) a junction section (60) adjacent the collar (50), and iii) a hollow body (56) extending axially away from the opening (48) of the neck (44) from the junction section (60) to a bottom (58), wherein,
 said gripper (42) includes at least a first jaw (64), a second jaw (66), and a housing (68) delimited between the first and second jaws (64, 66), wherein when transferring one said object, said housing (68) receives a portion of said object (14, 16),
 the gripper (42) moves between i) an open position in which said object (14, 16) can be extracted from between or inserted between the first and second jaws (64, 66) to occupy a particular reference position in the housing (68) and ii) a closed position in which, when said object (14, 16) is present, said jaws (64, 66) cooperate with at least a portion of said object (14, 16) to retain said object (14, 16) in said particular reference position,
 the first and second jaws (64, 66) each include, respectively:
 i) a first, clamping portion (94) that, in the closed position of the gripper (42), applies a radial clamping force to the junction section (60) of said object (14, 16), the radial clamping force retaining said object (14, 16) in said particular reference position in the housing (68), and
 ii) a second, locking portion (96) that, in the closed position of the gripper (42), is in axial abutment with a top surface of the rim (46) of the neck (44) of said object thereby axially locking said object in said particular reference position, and
 iii) a recess (92) that axially separates the first and second jaws (64, 66), the recess (92) being open radially, and
 the first, clamping portion (94) of each jaw (64, 66) includes a support face (98) that, in the closed position of the gripper (42) with said object (14, 16) occupying said particular reference position, cooperates with an adjacent portion of the bearing face (62) of the annular collar (50).

2. The device as claimed in claim 1, wherein,
 an amorphous area of the junction section (60) that is directly adjacent the collar (50) has a first height (E), and
 the first, clamping portion (94) of each jaw (64, 66) has an thickness (e),
 the first height (E) being greater than or substantially equal to the thickness (e) of the first, clamping portion (94) of each jaw (64, 66) such that, in the closed position of the gripper (42), the radial clamping force exerted by said first portion (94) of each jaw (64, 66) is applied to only to the amorphous area of the junction section (60).

3. The device as claimed in claim 1, wherein the second, locking portion (96) of each jaw (64, 66) includes at least one abutment face (102) that, in the closed position of the gripper (42), is in the axial abutment with a part of the top surface of the rim (46) of the neck (44) of said object thereby axially locking said object in said particular reference position.

4. The device as claimed in claim 3, wherein the abutment face (102) of the second, locking portion (96) of each jaw (64, 66) has an axial clearance "j" relative to the rim (46) of the neck (44) of the object (14, 16) occupying said particular reference position.

5. The device as claimed in claim 1, wherein the second, locking portion (96) is produced in one piece with the first, clamping portion (94) so that each jaw (64, 66) of the gripper (42) constitutes a one-piece subassembly.

6. The device as claimed in claim 1, wherein the second, locking portion (96) of each jaw (64, 66) of the gripper (42) consists of a locking arm (100).

7. The device as claimed in claim 6, wherein the second, locking portion (96) of each jaw (64, 66) each includes a frustoconical surface (104) which, on closing the gripper (42), cooperates with the neck (44) of said object to position the object (14, 16) in said particular reference position.

8. The device as claimed in claim 1, characterized in that the jaws of the gripper (42) are made of polyetheretherketone.

9. The device as claimed in claim 1, wherein the second, locking portion (96) of each jaw (64, 66) further includes
 i) an abutment face (102) that, in the closed position of the gripper (42), is in the axial abutment with a corresponding part of the top surface of the rim (46) of the neck (44) of said object thereby axially locking said object in said particular reference position, and ii) adjacent and radially interior to the abutment face (102), a frustoconical surface (104) which, on closing the gripper (42), cooperates with the neck (44) of said object to position the object (14, 16) in said particular reference position.

* * * * *